Nov. 2, 1971    HANS-GEORG WASCHULEWSKI ET AL    3,616,703
VIBRATION GENERATOR
Filed June 12, 1970    6 Sheets-Sheet 1

HANS-GEORG WASCHULEWSKI
HANS-REINHARD LAMBERTZ
WILHELM STOYE
    INVENTORS

BY
Darbo, Robertson &
Vandenburgh

Nov. 2, 1971 HANS-GEORG WASCHULEWSKI ET AL 3,616,703
VIBRATION GENERATOR
Filed June 12, 1970 6 Sheets-Sheet 2
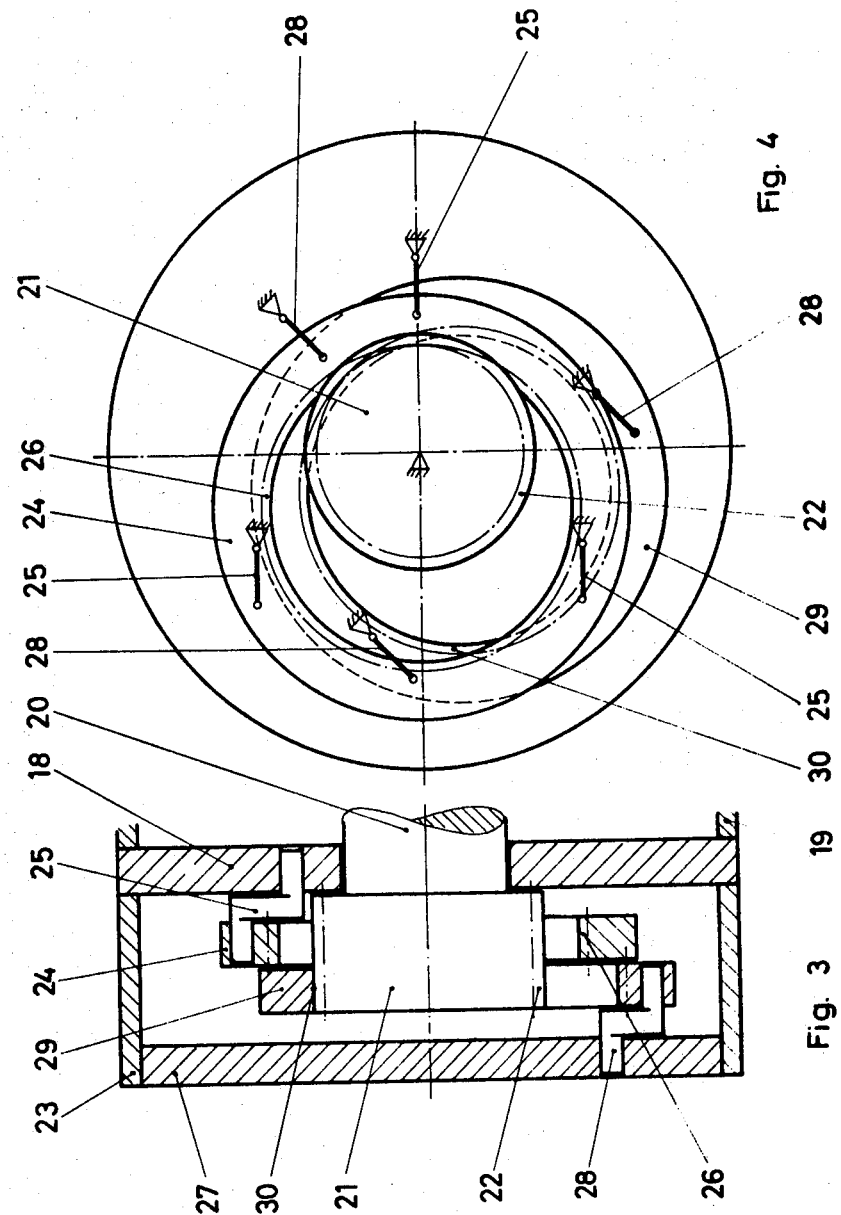
HANS-GEORG WASCHULEWSKI
HANS-REINHARD LAMBERTZ
WILHELM STOYE
INVENTORS
BY
Darbo, Robertson &
Vandenburgh

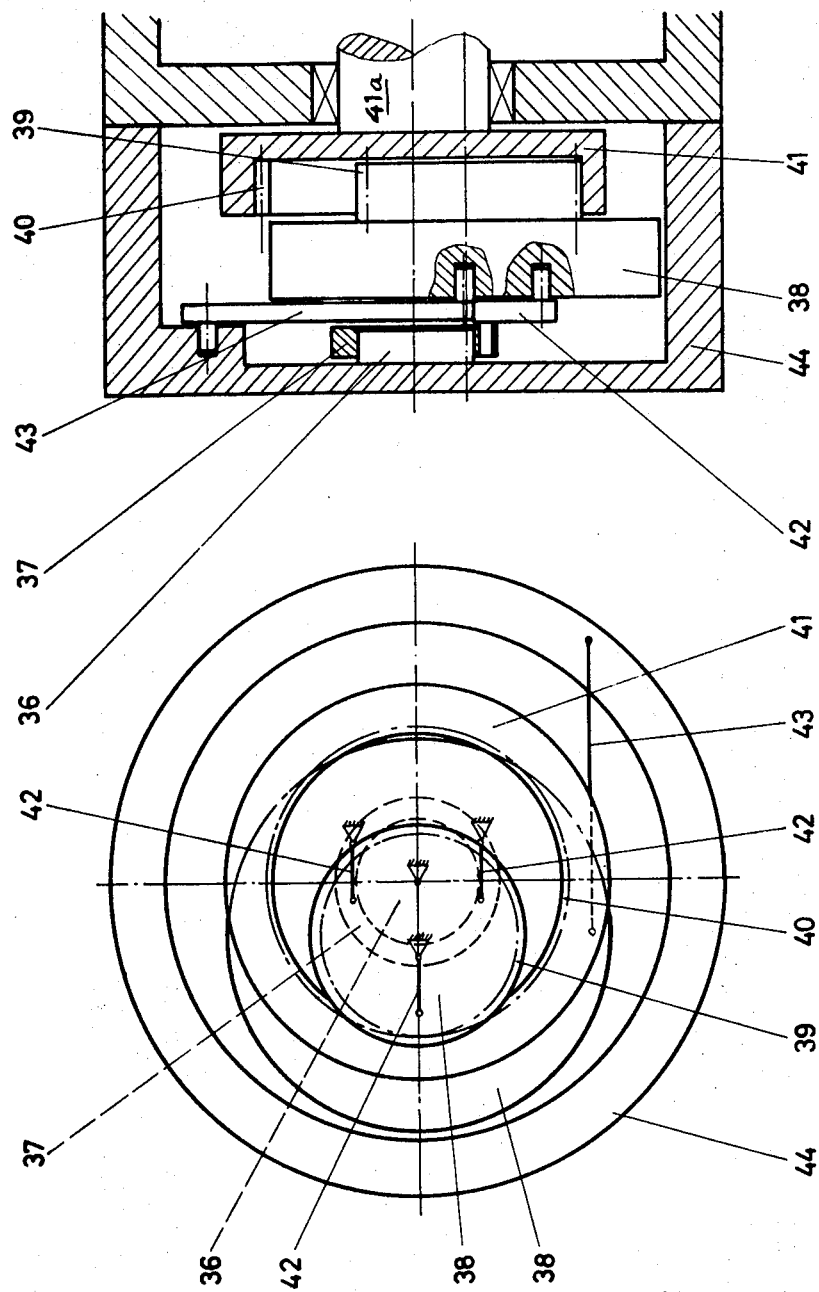

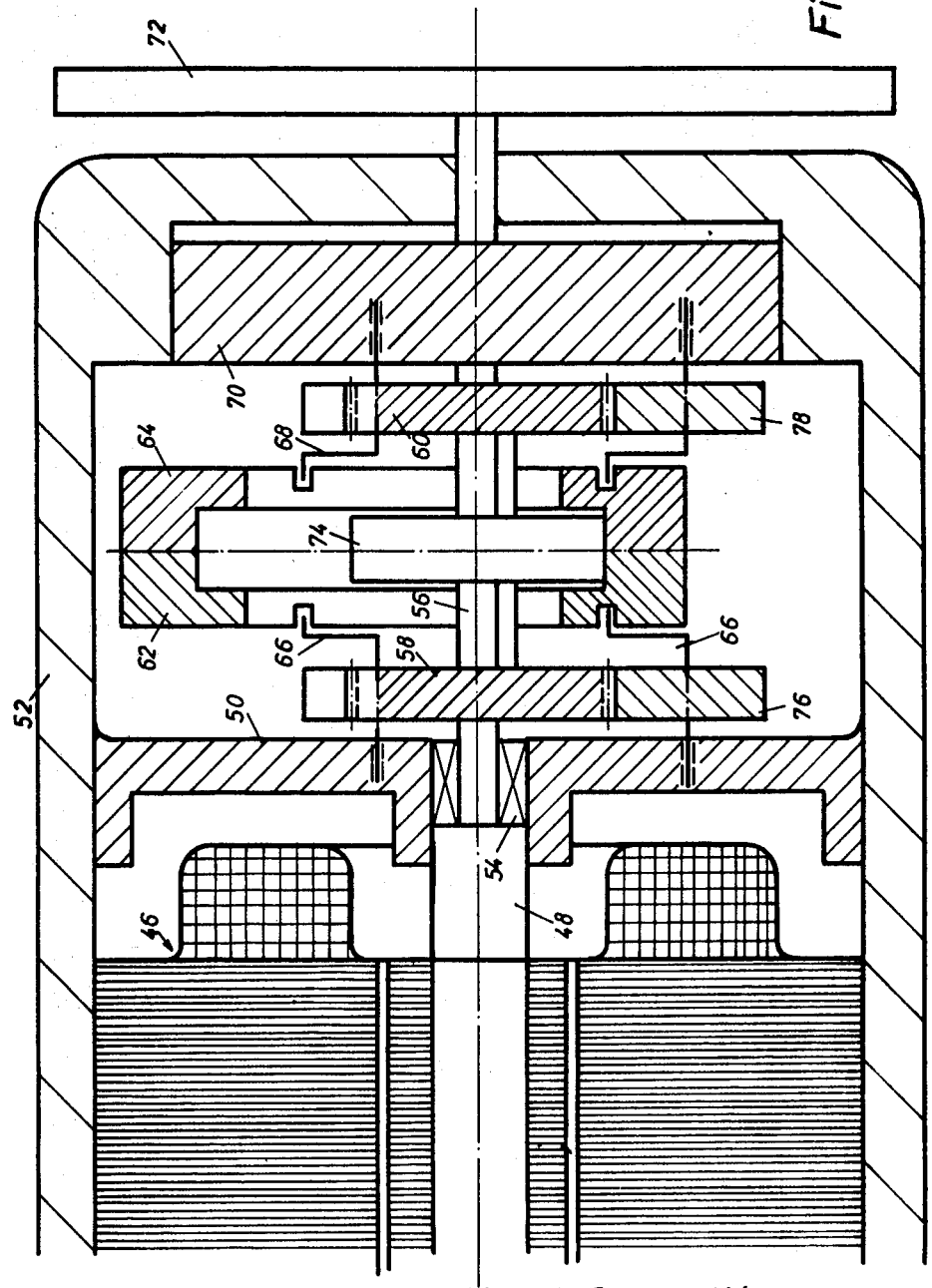

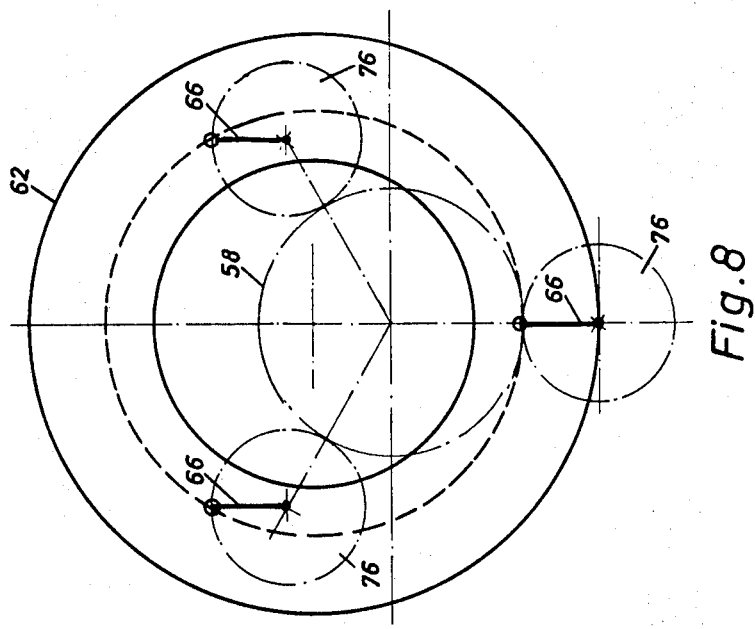

3,616,703
Patented Nov. 2, 1971

3,616,703
VIBRATION GENERATOR
Hans-Georg Waschulewski, Mettmann, Hans-Reinhard Lambertz, Hochdahl, and Wilhelm Stoye, Dusseldorf, Germany, assignors to Losenhausen Maschinenbau AG., Dusseldorf-Grafenberg, Germany
Filed June 12, 1970, Ser. No. 46,167
Claims priority, application Germany, June 13, 1969, P 19 30 078.8
Int. Cl. B06b 1/16
U.S. Cl. 74—87                    10 Claims

ABSTRACT OF THE DISCLOSURE

Three radius rods have a first set of rotatable connections between one end of the rods and a centrifugal weight and a second set of rotatable connections between the other ends of the rods and the frame and with the connections of each set being positioned 120° from each other so that the weight will move in a curvilinear path defined by the rod combination. A gear drive between the motor and the weight moves the weight about that path. A second similarly mounted centrifugal weight is connected to a rotationally adjustable part of the frame and by changing the rotational position of that part one may change the amplitude of vibration.

BACKGROUND AND SUMMARY OF THE INVENTION

The invention relates to a vibration generator having a centrifugal weight, guided on a curvilinear path and driven by a motor through a gear transmission.

In many conventional vibration generators the unbalance centrifugal weight is mounted on the motor shaft and rotates therewith. The unbalance produces forces which are utilized to produce vibrations. In these vibration generators the frequency thereof is defined by the rotational speed of the motor. If higher or lower vibration frequencies are to be generated it is necessary for the rotational speed of the motor to be varied. The rotational speed of three-phase motors is determined by the power line frequency. In order to obtain higher vibration frequencies from three-phase motors it is therefore necessary to provide an electrical generator for producing three-phase current of a correspondingly higher frequency.

It is also known to provide a power transmission between the motor and the centrifugal weight, either in the form of a gear transmission or in the form of a belt transmission, in order to obtain vibration frequencies other than those which would be normally obtained using motors having speeds tied to the power line frequency. Gear transmissions or belt transmissions of this kind however undesirably increase the physical dimension of the vibrator.

The prior art also discloses an arrangement in which a centrifugal weight is guided on a circular track around the motor axis and is driven by a gear transmission having an internal and external gear of different pitch diameter. In such a system the roll-shaped centrifugal weight is rotatably journalled on a shaft which moves along a circular track and rolls on a raceway of the housing and is driven through its shaft via the gear transmission. The centrifugal weight is guided by virtue to the fact that a support, having the aforementioned shaft, is guided on the one hand by conical extensions on said support and on the housing or motor shaft and on the other hand by the roll-shaped centrifugal weight and raceway. A construction of this kind is complex and bulky.

It is the object of the invention to provide a vibration generator in which the vibration frequency differs from the rotational speed of the motor or driving shaft.

It is a particular object of the invention to provide a vibration generator of the kind heretofore described, having a simple and compact construction.

According to the invention, this is achieved in that the centrifugal weight is guided in gyratory manner by means of a parallel radius rod suspension, comprising three radius rods of equal length, one ends of which rods are rotatably disposed at intervals of 120° on a circle which is concentric with the drive shaft or the motor shaft, the other ends of said radius rods being similarly disposed in a circle and rotatably connected to the centrifugal weight, the length of said radius rods being shorter than the chordal distance between the rotatable connections.

In a system of the kind heretofore described, the centrifugal weight describes a gyratory motion in which centrifugal forces will, of course, become effective. The frequency of the aforementioned gyratory motion will, however, differ from the rotational speed of the motor. A step-up or step-down ratio between the smaller diameter and the difference of the diameters of the internal and external gears can thus be obtained. A system of this kind with a gyrating centrifugal weight may be disposed in very compact manner, for example, on the ends of an electric motor, so that the physical dimensions of the vibrator do not exceed those of a conventional vibrator having a rotating, gyrating centrifugal weight.

The invention permits the construction in a simple manner of the vibration generator in such a way that the vibration amplitude may be steplessly varied during operation. This is achieved by a first centrifugal weight being guided by means of one parallel radius rod suspension on a part which is fixed relative to the housing and a second centrifugal weight being similarly suspended on a part which is rotatably adjustable relative to the motor axis. Rotational adjustment of the last mentioned part enables the phases of the gyratory motions of the two centrifugal weights to be varied relative to each other so that the resultant centrifugal force is steplessly adjusted.

In some embodiments of the invention the centrifugal weight is a ring with internal gearing meshing with a pinion on the motor shaft. In another embodiment the centrifugal weight is a spur gear which meshes with an internal gear driven by the motor. It is also possible for one end of each radius rod to be coaxially connected to respective gear wheels by means of which the rods are rotated; said gear wheels being planetary to and meshing with a pinion on the motor shaft; the gear wheels and the pinion forming the aforementioned gear transmission.

In a further embodiment of the invention it provides a directional vibrator, that is to say, a vibration generator which generates vibrations in substantially only one plane. To this end, and for the generation of directional vibrations, one ends of the radius rods of the suspension are rotatably connected to the centrifugal weight and the other ends are rotatably connected to a ring which is rotatably journalled on a shaft coaxial with the motor shaft; the centrifugal weight also is connected through a fourth radius rod to a position which is fixed relative to the housing. In such an embodiment the ring on the shaft performs a reciprocating rotary motion while the centrifugal weight moves about a path which is mainly reciprocal along a line.

DESCRIPTION OF THE DRAWINGS

FIG. 3 is a longitudinal section of another embodiment of the invention with two centrifugal weights permittting stepless variation of the vibration;

FIG. 4 is a diagrammatic end view of the embodiment of FIG. 3;

FIG. 6A is a longitudinal section of a further embodiment;

FIG. 6B is a diagrammatic end view of the embodiment of FIG. 6A;

FIG. 7 is a longitudinal section of a further embodiment of the invention; and

FIG. 8 is a diagrammatic end view taken at the motor side.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

Figure 1:
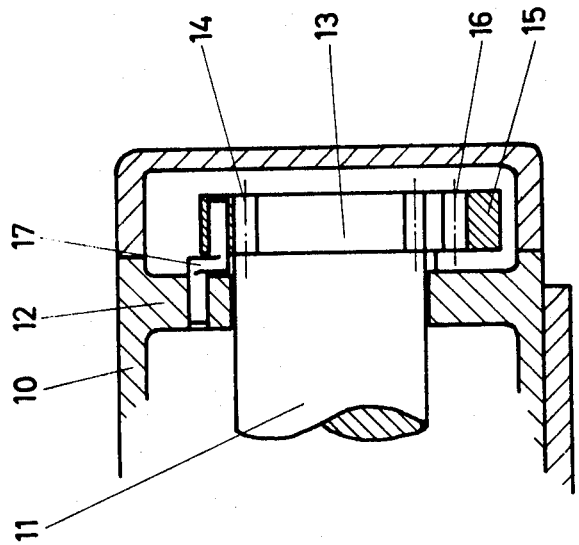
FIG. 1 is a longitudinal section through a centrifugal weight system according to the invention.
Figure 2:
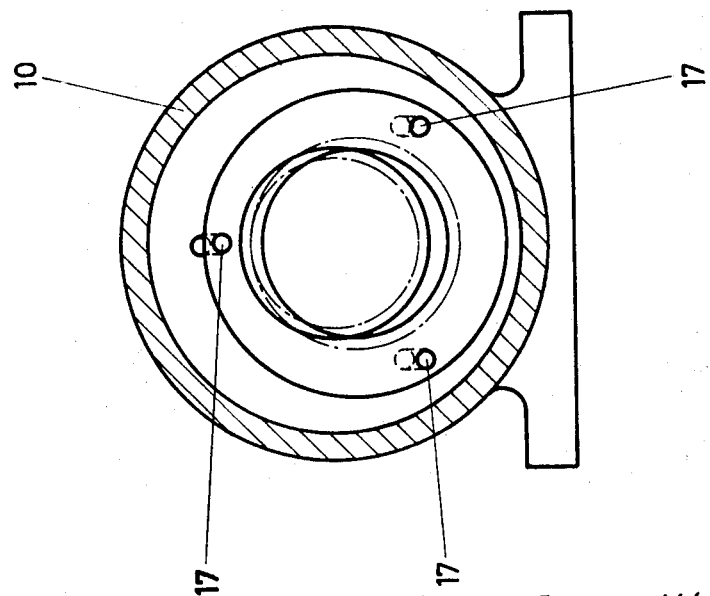
FIG. 2 is a section through FIG. 1 taken just to the right of the centrifugal weight.

In FIGS. 1 and 2 there is a motor housing 10 having an end wall 12 in which a motor shaft 1 is journalled. A pinion 13 having external teeth 14 is secured on the end of the motor shaft. A centrifugal weight 15 is formed by a ring having internal teeth 16. The internal teeth 16 are positioned about a pitch diameter D which is larger than the pitch diameter $d$ of the external teeth 14 of the pinion 13. The centrifugal weight 15 gyrates in a path normal to the shaft 11 and is guided in that path by means of a parallel radius rod suspension. This suspension comprises three radius rods 17 having one end of each rotatably connected to the weight 15 and the other ends rotatably supported in motor wall 12. The length of the radius rods is so dimensioned that portions of the internal teeth 16 of the centrifugal weight 15 always remain in mesh with portions of the teeth 14 of the pinion 13.

If the motor shaft 11 is operated at a speed $m$, the centrifugal weight will perform a gyratory motion at a frequency ($m'$):

$$m' = m \cdot \frac{d}{D-d}$$

Consequently, it is possible to produce a relatively high frequency gyratory motion of the centrifugal weight 15, thus generating a correspondingly high vibration frequency since the gyratory motion is accompanied by the action of a centrifugal force on the centrifugal weight 15.

As already mentioned, the parallel radius rod suspension comprises three radius rods 17 which are pivotably supported at one end in the intermediate wall 12 and at the other end of the centrifugal weight 15. The ends of three radius rods 17 supported in the intermediate wall 12 are positioned at an angular spacing of 120° relative to each other on a circle which is concentric to the motor shaft 11. The opposite ends of the radius rods 17 are mounted in the annular centrifugal weight 15 on a circle at a spacing of 120° relative to each other. The length of the radius rods is smaller than the chordal distance between the individual supporting points so that said radius rods can rotatably pass each other in the course of the gyratory motion.

FIGS. 3 and 4 disclose a system which permits stepless variation of the vibration amplitude during operation. A motor shaft 20 is supported in an end wall 18 of the motor housing 19. The end of shaft 20 has a pinion 21 mounted thereon. Pinion 21 has external teeth 22. The motor housing is provided with a cap 23 adjustably rotatable around the motor shaft relative to the remainder of the motor housing 19. A first centrifugal weight 24 is mounted on the intermediate wall 18 by means of a parallel radius rod suspension formed by radius rods 25. By reason of this suspension centrifugal weight 24 gyrates in a path around the motor shaft (corresponding to that described in connection with weight 15 in FIGS. 1 and 2) while being driven by a gear transmission. This gear transmission comprises internal teeth 26 on weight 24 and external teeth of the pinion 21.

A second centrifugal weight 29, also in the form of a ring provided with internal teeth 30, is mounted on the endface 27 of the cap 23 by means of a second parallel radius rod suspension formed by three radius rods 28. Thus the second centrifugal weight will also gyrate in a path around the motor shaft as it is driven by the gear transmission formed by internal teeth 30 meshing with the teeth 22 of the pinion 21.

When the motor shaft 20 is driven, both centrifugal weights 24 and 29 perform gyratory motions at a frequency $m'$, said frequency being defined by the formula mentioned earlier in conjunction with FIGS. 1 and 2. By rotating the cap 23 relative to the motor housing 19 it is however possible for the relationship between the phase of the centrifugal weights 24 and 29 to be varied and thus for the magnitude of the resultant centrifugal force to be varied.

Figure 5:
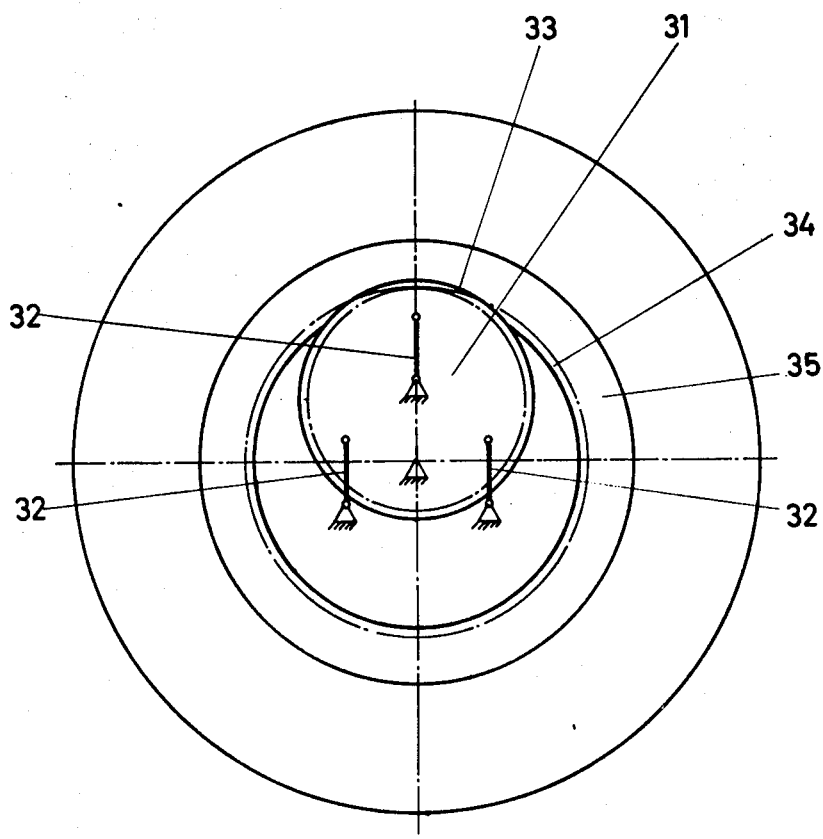
FIG. 5 is a diagrammatic illustration of an embodiment in which the centrifugal weight has external gearing which meshes with an internal gear on the motor shaft.

In the foregoing embodiments, the centrifugal weight was in annular form having internal teeth which meshed with external teeth of a pinion mounted on the motor shaft. However, as shown by reference to FIG. 5, the weight may be inside the motor gear. Here the centrifugal weight 31 is suspended from the housing by means of three radius rods 32 rotatably connected at one end to the weight and at the other to the housing. Weight 31 has external teeth 33 which mesh with internal teeth 34 on a bell 35 secured to one end of the motor shaft and making up the gear transmission. As the weight 31 is driven by this gear transmission, it gyrates in a path in a plane normal to the motor shaft.

FIGS. 6A and 6B show a system suitable for generating directional vibrations. A ring 37 is rotatably journalled on a shaft 36 forming a part of the frame 44 and coaxial with the drive shaft 41a. A centrifugal weight 38 has an external spur gear 39 along one side thereof. Gear 39 meshes with the teeth of an internal gear 40 of a bell 41 joined to the motor shaft 41a. The centrifugal weight 38 is joined to the ring 37 by means of a parallel radius rod suspension which comprises three radius rods 42. A radius rod 43 has one end pivotally connected to housing 44 and one end pivotally connected to weight 38.

The radius rod 43 limits the motion of the centrifugal weight 38 to a vibratory motion which is mainly horizontal in FIG. 6B. To compensate for this limitation, the ring 37 is able to rotate on shaft 36. In this way, the vibrations thus generated are substantially linear.

In the embodiment illustrated in FIGS. 7 and 8, the numeral 46 refers to an electric motor whose motor shaft 48 journalled in a bearing 54 disposed in the intermediate wall 50 of a vibrator housing 52. Two pinions 58, 60 are disposed on one end 56 of the shaft 48 on opposite sides of a pair of annular centrifugal weights 62, 64. Centrifugal weight 62 is guided in gyratory manner by means of a parallel radius rod suspension. This suspension is formed by three radius rods 66. One respective ends of the three rods are positioned 120° apart from each other on a circle and rotatably secured in the intermediate wall 50. The other ends are correspondingly oriented with respect to each other and rotatably secured in the weight 62. Thus, the centrifugal weight is guided in such a way that it can perform a gyratory motion while retaining its orientation in space. The housing 52 has an adjustably rotatable part 70 which can be positioned by a handle 72. A radius rod suspension formed by three radius rods 68 connects weight 64 to part 70. Thus, the centrifugal weights 62, 64 are supported for gyration in paths lying in planes parallel to each other and normal to the axis of the motor shaft. During the gyratory motions the centrifugal weights 62 and 64 roll on a pulley member 74 which is disposed on the motor shaft end 56 between the pinions 56 and 60.

Three gear wheels or pinions 76 are orbitally positioned about a driving pinion 58 and with their axes 120° apart. These are fixedly connected to the associated radius rods 66 and are rotatable relative to the intermediate wall 50 about the axes of rotation of the radius rods 66 at an end thereof. Upon being driven by pinion 58, these gear wheels rotate the radius rods to obtain the gyrating motion of the centrifugal weight 62. The centrifugal weight 64 is driven to gyrate in corresponding manner by means of the meshing driving pinion 60 and three gear wheels 78 connected to the radius rods 68.

Rotation of the part 70 by means of the adjusting wheel 72 enables the relative angular position of the two centrifugal weights 62, 64, which gyrate in the same direction, to be varied and therefore for the resultant unbalance to be varied.

We claim:
1. In a vibration generator comprising a frame, a drive shaft journalled in the frame, a centrifugal weight, means mounting the weight for movement in a path eccentrically with respect to the drive shaft and lying in a plane intersecting the drive shaft, and a gear transmission connecting the drive shaft and the weight, the improvement wherein said means comprises:
three radius rods of equal length and positioned parallel to said plane, a first respective ends of the three rods being rotatably connected to the weight for movement about axes normal to said plane, the second respective ends of the three rods being rotatably connected to the frame for movement about axes normal to said plane, the three axes at said first ends of the three rods being spaced apart a distance greater than the length of the rods and being positioned 120° apart in a circle, the three axes at said second ends of the three rods being spaced apart a distance greater than the length of the rods and being positioned 120° apart in a circle.
2. In a vibration generator as set forth in claim 1, wherein said frame has a part adjustable rotationally about said axis;
said generator including
a second centrifugal weight,
a second means corresponding to said mounting means as recited in claim 1, and connecting said second centrifugal weight to said part for mounting the second weight for movement in a path eccentrically with respect to the drive shaft, and
a second gear transmission connecting said shaft and said second weight.

3. In a vibration generator as set forth in claim 2, wherein each transmission includes a gear on the respective weight, a gear on said shaft engaging said gear on the respective weight, one of said gears being an internal gear, the other of said gears being an external gear, each of said gears having a pitch diameter, the pitch diameter of said one gear being greater than the pitch diameter of the other gear.
4. In a generator as set forth in claim 3, wherein each said weight is a ring with the one gear being on the interior of the ring, said other gear being on the shaft.
5. In a generator as set forth in claim 2, wherein each transmission comprises:
a pinion on said shaft;
three planetary gears about said pinion and in engagement therewith, said planetary gears each having an axis and positioned with their axes 120° apart and coinciding respectively with the axes at the second respective ends of the three rods;
said second respective ends of the three rods being fixedly attached to a respective gear whereby the rods are rotated by the respective gears about said coinciding axes.
6. In a vibration generator as set forth in claim 1, wherein said transmission includes a gear on said shaft engaging a gear on the respective weight, one of said gears being an internal gear, the other of said gears being an external gear each of said gears having a pitch diameter, the pitch diameter of said one gear being greater than the pitch diameter of the other gear.
7. In a generator as set forth in claim 6, wherein said weight is a ring with the one gear being on the interior of the ring, said other gear being on the shaft.
8. In a generator as set forth in claim 6, wherein said other gear is attached to said weight and said one gear is attached to said shaft.
9. In a generator as set forth in claim 1, wherein said transmission comprises:
a pinion on said shaft;
three planetary gears about said pinion and in engagement therewith, said planetary gears each having an axis and positioned with their axes 120° apart and coinciding respectively with the axes at the second respective ends of the three rods;
said second respective ends of the three rods being fixedly attached to a respective gear whereby the rods are rotated by the respective gears about said coinciding axes.
10. In a vibration generator as set forth in claim 1, wherein the rotatable connection between the second respective ends of the three rods and the frame is formed by
a ring rotatably journalled on the frame, said second respective ends being rotatably connected to said ring; and
wherein said generator includes a fourth radius rod, one end of the fourth radius rod being connected to the weight and the other end thereof being connected to the frame.

References Cited
UNITED STATES PATENTS 1,500,988    7/1924    Goldschmidt _____ 74—61
3,446,084    5/1969    Bodine, Jr. _____ 74—87

MILTON KAUFMAN, Primary Examiner

U.S. Cl. X.R.

94—48; 175—55; 209—366.5; 259—1 R